United States Patent [19]

Vidwans

[11] Patent Number: 5,156,440
[45] Date of Patent: Oct. 20, 1992

[54] HEAD RESTRAINT ADJUSTMENT MECHANISM

[75] Inventor: Mohan P. Vidwans, Saline, Mich.

[73] Assignee: Hoover Universal, Inc., Plymouth, Mich.

[21] Appl. No.: 864,313

[22] Filed: Apr. 6, 1992

[51] Int. Cl.$^5$ ............................................. A47C 7/36
[52] U.S. Cl. ...................................................... 297/410
[58] Field of Search ............ 297/410; 248/118, 118.3, 248/118.5, 221.3, 407, 408; 403/104, 106, 109, 326, 378, 379

[56] References Cited

U.S. PATENT DOCUMENTS

| | | | |
|---|---|---|---|
| 4,527,834 | 7/1985 | Zyngier | 297/410 |
| 4,577,904 | 3/1986 | Wiese et al. | 297/410 |
| 4,844,545 | 7/1989 | Ishii | 297/410 |
| 4,976,493 | 12/1990 | Frankila | 297/410 |

FOREIGN PATENT DOCUMENTS

| | | | |
|---|---|---|---|
| 2902246 | 7/1990 | Fed. Rep. of Germany | 297/410 |
| 2537064 | 6/1984 | France | 297/410 |

Primary Examiner—Peter R. Brown
Attorney, Agent, or Firm—Harness, Dickey & Pierce

[57] ABSTRACT

An adjustment mechanism for a vehicle head restraint assembly is disclosed in which the head restraint pad is supported on one or more posts having a plurality of V-shaped detent notches for engagement by a wire spring to hold the head restraint pad in place. The posts fit into guide bushings which contain a flange enclosing a wire spring, a portion of which engages the notches during normal use to prevent unwanted movement of the head restraint pad while allowing vertical adjustment of its position. The spring and flange are constructed to distribute loads arising from adjustment of the head restraint pad to both sides of the spring, resulting in a relatively even distribution of the forces acting on the spring during adjustment and providing the spring with a longer fatigue life.

6 Claims, 2 Drawing Sheets

HEAD RESTRAINT ADJUSTMENT MECHANISM

BACKGROUND AND SUMMARY OF THE INVENTION

This invention relates to an automotive seat head restraint adjustment mechanism and particularly to a locking mechanism for the head restraint assembly. It provides detents for various extended positions of the head restraint and a bushing with an upper flange containing a wire spring to supply a resistive force for securing the head restraint pad in place.

Motor vehicle manufacturers provide head restraints for occupant seats as a comfort and safety feature. Head restraints provide a surface which the seat occupants can rest their heads against and also provide occupant protection by controlling rearward excursion of the occupant's head in rear impact situations and secondary excursion of the occupant's head in frontal compact situations.

Head restraints can be categorized in several different general types. The so-called integral head restraint or "high back" seat has a seat back with a vertical extension forming a head restraint. Another type of seat has a separate head restraint pad extending upwardly above the seat back and frequently has a mechanism for allowing the vertical position of the pad to be adjusted and positioned for a particular seat occupant. Vertical adjustment of these types of head restraints is typically accomplished by providing one or more posts extending from the head restraint pad into the seat back, with the mechanism mounted within the seat back for allowing the position of the head restraint pad to be adjusted and set at a desired position. As a means of preventing inadvertent removal of the head restraint from the seat back, which could occur during adjustment, a latch or stop may be provided which limits the upward extent of adjustment of the head restraint pad. Further means are often provided for unlatching the stop which enable the head restraint pad to be removed from the seat back for vehicle repair, servicing or retrimming.

While numerous designs for head restraint assemblies of the above type are known, manufacturers of motor vehicle components are constantly striving to increase productivity by simplifying seat assembly. One method of locking the head restraint in different vertical positions uses tubular plastic guides containing the headrest post, which contains V-shaped notches equally spaced along the length of the post. A wire spring connected to the guides engages the notches and provides a resistive force to prevent inadvertent movement of the head restraint pad. One such prior art device, disclosed in U.S. Pat. No. 4,976,493, relies on a D-shaped wire spring to provide the resistive force. While this spring geometry provides an adequate vertical resistive force, the spring only deflects at one place during vertical adjustment of the head restraint, and is therefore subject to early fatigue failure.

Accordingly, it is an object of the present invention to provide a head restraint adjustment mechanism with a new spring geometry which distributes the resistive force applied by the spring during adjustment of the head restraint as evenly as possible. To achieve this object, the top flange of the plastic mounting guides and the spring of the present invention are constructed having a geometry which allows head restraint adjustment forces to be distributed over both ends of the spring rather than be concentrated at a single point. The resulting force distribution is therefore more even than that associated with prior art devices, and the spring design of the present invention therefore has a longer fatigue life as well.

DETAILED DESCRIPTION OF THE INVENTION

Figure 1:
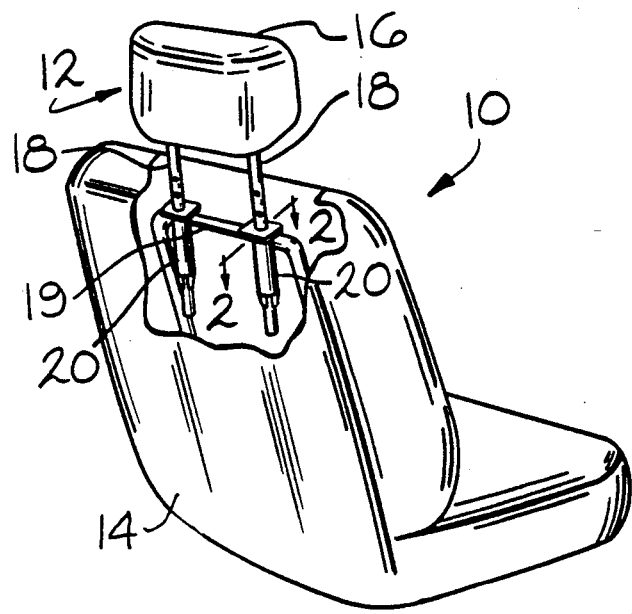
FIG. 1 is a perspective view of a vehicle seat assembly which includes the head restraint adjustment mechanism of the present invention.

With reference to the drawings, a vehicle seat assembly 10 is shown in FIG. 1. The seat assembly 10 has a back 14, and a head restraint assembly 12 is mounted on the seat back 14. The assembly 12 includes a head restraint pad 16 and a pair of downwardly-extending mounting posts 18, which are received by a pair of tubular bushings 20 which are mounted on the seat back 14. An internal frame member 19 in the seat back 14 contains tubular or similar metal guides 21, which support the bushings 20 in spaced upright positions in the seat back 14 at positions below the pad 16 and in alignment with the posts 18. Each bushing 20 forms a part of the head restraint adjustment mechanism of this invention, indicated generally at 12 in FIG. 1. During assembly of the seat, bushing 20 is inserted into guide 21, which is fixed to the seat back frame 19. A slot 26 in the bushing allows the two halves of flange 25 to be squeezed together as they are moved through the guide. On exiting the bottom of the guide, flanges 25 spring outward, abutting the lower surface of the guide 21 and locking bushing 20 into guide 21.

Figure 2:
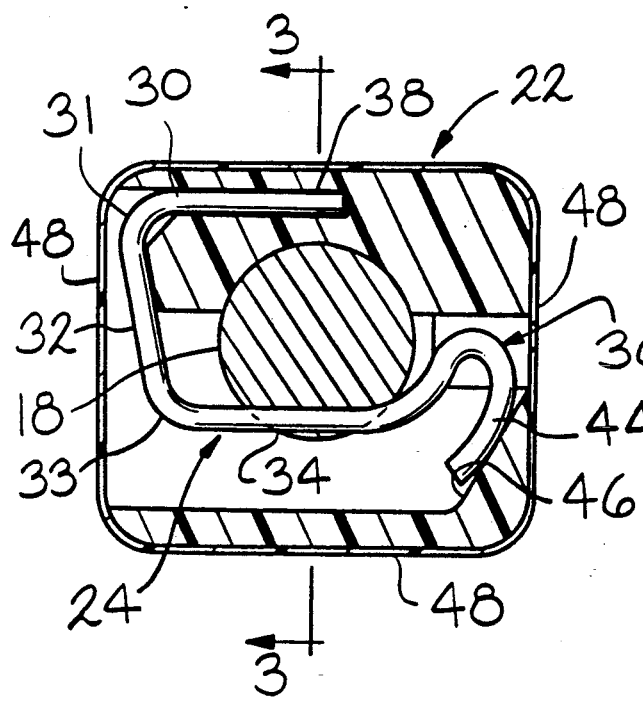
FIG. 2 is an enlarged sectional view of the head restraint adjustment mechanism of the present invention as seen from the line 2—2 in FIG. 1.
Figure 3:
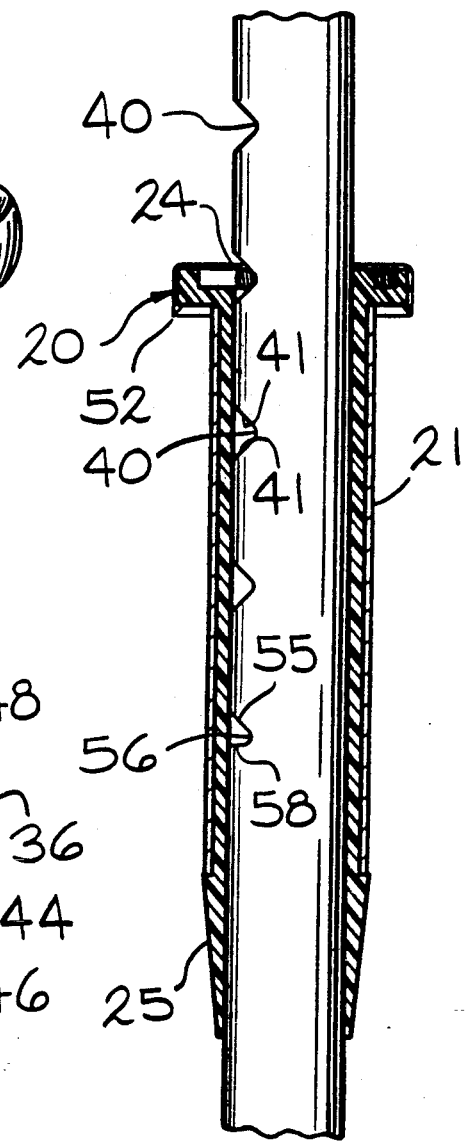
FIG. 3 is a fragmentary vertical sectional view of the head restraint adjustment mechanism of this invention as seen from line 3—3 in FIG. 2.
Figure 4:
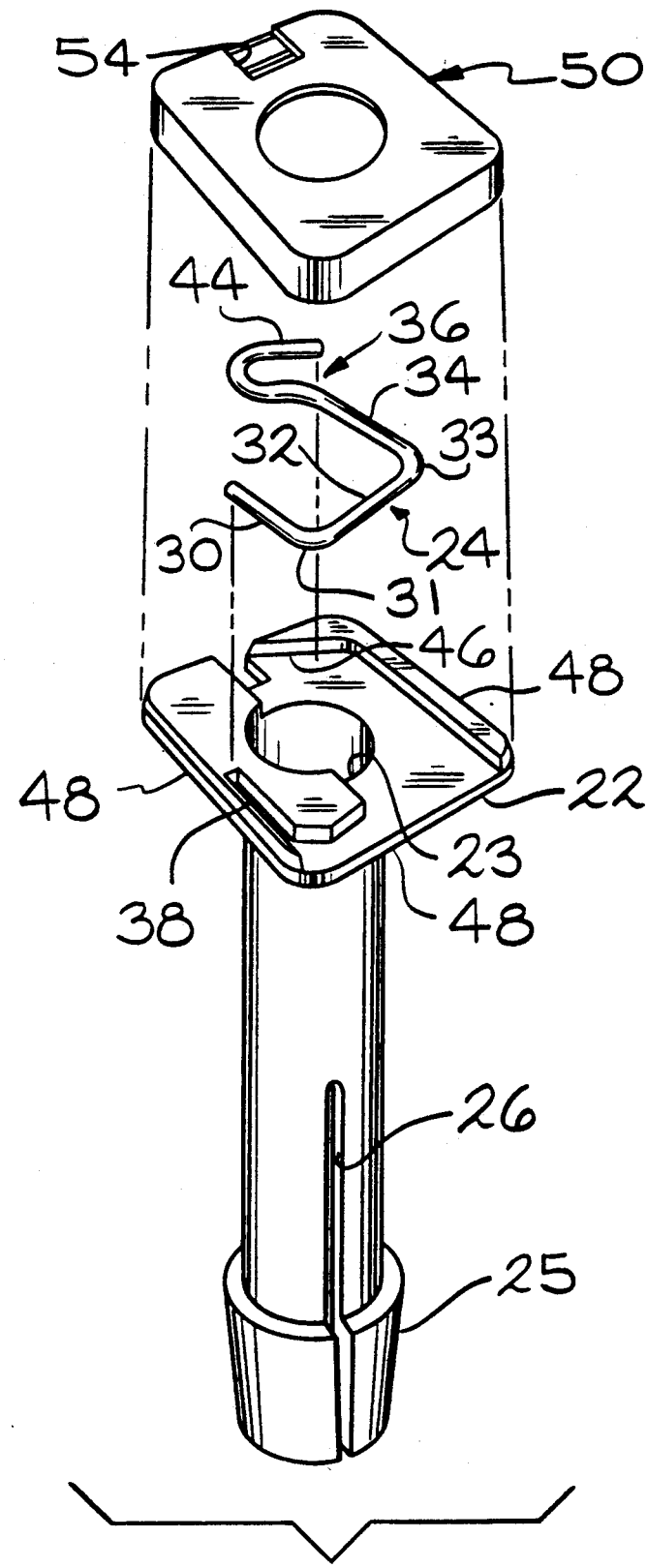
FIG. 4 is an exploded perspective view of the head restraint adjustment mechanism of the present invention.

FIGS. 2-4 illustrate the mechanism for locking the head restraint pad in the desired position. Referring to FIGS. 2 and 4, the top flange 22 is molded to contain a center opening 23 through which the head restraint post passes as well as a series of openings and angled surfaces to conform to the geometry of a wire spring 24.

The spring 24 consists of several areas which are designated for convenience as the fixed end portion 30, the first bent portion 32, the notch-engaging portion 34, and the free end portion 36 which is of a return bent upon itself shape. From the drawings, it can be seen that the top flange 22 contains a narrow rectangular cutout or cavity 38 to firmly hold the fixed end portion 30 of the spring 24 in place. This fixed end portion terminates at a bend 31, and the first bent portion 32 of the spring connects the bend to the notch-engaging portion 34. The notch-engaging portion 34 extends into the center opening 23, where it normally fits into one of the head restraint notches 40, as shown in FIG. 3.

The free end portion 36 of the spring extends from the detent-engaging portion 34 and is shown as generally U-shaped in one embodiment of the present invention. As shown, the entire free end portion 36 of spring 24 may be displaced by movement of the head restraint post 18. The outer half 44 of the end portion 36 abuts a molded surface 46 of the flange, which is inclined or angled relative to the sides 48 of the top flange. When the spring 24 is flexed during adjustment of the head restraint pad, the half 44 of the spring free end portion is guided by surface 46 which may also act to compress the return bent upon itself shape, decreasing its width.

In the position shown in FIGS. 2 and 3, the spring 24 prevents unintended vertical movement of the head restraint, since the notch-engaging portion 34 of the spring 24 fits into one of the head restraint post notches 40, thereby preventing the post from being moved by relatively small forces.

The vehicle occupant wishing to adjust the vertical position of the head restraint pad 16 simply pulls upward or downward on the head restraint pad 16 to, in turn, move the posts 18 up or down. Each post has a plurality of vertically spaced notches 40 lack of which has inclined ramp surface 41 engagable with the spring portion 34. In response to up or down movement of a post 18 a notch ramp surface 41 engaged with the spring 24 will apply enough force to overcome the elastic resistance of spring 24 to force the notch-engaging portion 34 of the spring 24 out of the notch 40. This movement displaces the notch-engaging portion 34 of spring 24 radially outward from post 18, deforming it at bend 31, moving bent portion 32 away from post 18, deforming the spring at bend 33, and moving return bent free end portion 36 along inclined surface 46. The return bent shape of the portion 36 provides for the half 44 being continuously urged against the inclined surface 46. This enables the free end portion 36 to float along surface 46 so that the portion 34 can work in and out of notches 40 on the post 18. The portion 36 can also flex or expand to ensure contact at all times with the guide surface 46. When the selected location for the head restraint pad has been reached, notch-engaging portion 34 of the spring 24 slides back along the ramped surface 41 of another detent notch 40 into the notch, releasing the elastic forces placed on the spring 24 during movement.

An end cap 50 fits over the top flange 22 and is connected by a suitable fastener 52 such as a snap-over shoulder or lip. End cap 50 resists the tendency of spring 24 to move upward out of the top flange 22 during upward adjustment of the head restraint pad 16.

Posts 18 contain a bottom locking notch 56 which has an upper ramped surface 55 and a radially-extending lower surface 56. This lower surface 56 prevents inadvertent removal of the head restraint pad 16 from bushings 20 since its lower surface is perpendicular to the direction of movement of post 18; upward force on post 18 therefore cannot force the notch-engaging portion 34 of spring 24 out of the notch. End cap 50 contains a slot 54 to facilitate purposeful removal of the head restraint. The slot 54 allows insertion of a screwdriver or similar tool to engage the free end portion 36 of spring 24 and pry it out of engagement with detent notch 56, permitting removal of posts 18 from bushings 20.

For vehicle seat designs using more than one post 18, such as shown in FIG. 1, an identical adjustment mechanism assembly of the type described above may be used for each post. Alternatively, one of the post receiving bushings may act solely as a guide without a spring to retain the head restraint or prevent inadvertent removal of the post.

It is important to note that the spring 24 deforms elastically at a plurality of points along its length, including, at the corner bends 31 and 33. The generally straight portions 32 and 34 adjacent the bends are also deformed and moved to new positions. In addition, the return bent free end portion 36 is maintained in engagement with inclined surface 46 at all times to provide for controlled movement of the spring 24. Thus, the forces applied to the spring during vertical adjustment of the head restraint gives rise to lower force levels at each point of deformation on the spring 24 and therefore distributes the resulting force load from adjustment quite evenly over the spring member 24. Such force distribution avoids stress concentration points in the spring 24 and results in a longer service life for spring 24 than that of prior art devices, in which all of the resistive force provided by the spring is concentrated at a single point or bend. A longer life for the spring reduces the maintenance effort required for the head restraint assembly. In addition to reducing forces on the spring during adjustment, the head restraint adjusting mechanism of the present invention includes only three components, the bushing 20, spring 24 and end cap 50, thus simplifying assembly.

The force with which the spring member 24 is engaged with the post 18 is determined by the shape of the spring 24 and the diameter of the spring wire used to form the spring 24. In the present case the shape of the spring 24 permits the use of a relatively small diameter wire.

It is to be understood that the invention is not limited to the exact construction illustrated and described above, but that various changes and modifications may be made without departing from the scope and spirit of the invention as defined in the following claims.

What is claimed is:

1. In a vehicle seat having a generally upright back having an upper end, a head restraint pad mounted on and positioned above said upper end, at least one post connected to and supporting the head restraint pad, and an upright tubular guide sleeve for said post mounted on said seat back, said post containing a plurality of vertically spaced detent notches on its outer surface, said notches having inclined surfaces and extending transversely along said post on one side of said post, a mechanism for enabling said head restraint pad to be adjusted up and down with respect to said back, said mechanism comprising:

a tubular bushing mounted on and telescoped into said guide sleeve, a one-piece bent wire spring member mounted on said bushing at a position in which said spring is engagable with said notches to retain said head restraint pad in an adjusted position, said spring having a notch-engaging portion biased toward said detent notches to enable selective positioning of the head restraint post when applying a substantially vertical force to the head restraint pad, said spring further having a fixed end portion connected to said bushing, a first bent portion between said fixed end and said notch-engaging portion, and a free end portion including a second bent portion, said bushing further containing means engaged with said free end portion for guiding and flexing said free end portion of said spring when said notch-engaging portion of said spring is forced radially outward from a detent notch, said notch-engaging portion of said spring applying a force to said post resistive to vertical movement of the head post within said bushing, thereby restraining movement of said head restraint post in said bushing, enabling resisted vertical adjustment of the position of the head restraint post by application of sufficient vertical force, the provision of first and second bent portions in said spring causing said spring to deflect at a plurality of locations along its length during adjustment of said pad whereby the force applied to said spring during adjustment of said head restraint is distributed along the length of said spring member when adjusting the position of the head restraint pd to thereby avoid stress concentration in said spring member and provide for a prolonged service life of the spring member.

2. The mechanism of claim 1 wherein said bushing further comprises an end cap mounted on the upper end of said bushing and provided with a circular opening for receiving the head restraint post, said end cap confining said spring within said bushing during adjustment of said pad, said end cap including means to fasten said end cap to said bushing.

3. The mechanism of claim 1 wherein said bushing contains a rectangular cutout portion to confine said fixed end of said spring and wherein said fixed end, said first flexing portion, and said notch-engaging portion of said spring form a return bent upon itself portion of said spring.

4. The mechanism of claim 1 further including an inclined surface on said bushing engaged with said free end of said spring for guiding said free end during movement thereof between positions of said spring engaged with and disengaged from a post detent.

5. The mechanism of claim 4 wherein said second bent portion of said free end portion of said spring forms a return bent upon itself shape, said return bent upon itself shape capable of compression along its width to aid in guiding said free end portion of said spring along said inclined surface.

6. The mechanism of claim 1 wherein the upper surface of said bushing forms a cavity, the sidewalls of said cavity creating a rectangular enclosure containing the fixed end of said spring, preventing said fixed end from moving when said spring is deflected during adjustment of said head restraint, and a surface angled with respect to one of the side faces of said bushing and guiding said free end of said spring allowing said free end to move conformably to said angled surface when said spring is deflected during adjustment of said head restraint.

* * * * *

UNITED STATES PATENT AND TRADEMARK OFFICE
CERTIFICATE OF CORRECTION

PATENT NO. : 5,156,440

DATED : October 20, 1992

INVENTOR(S) : Mohan P. Vidwans

It is certified that error appears in the above-identified patent and that said Letters Patent is hereby corrected as shown below:

Column 5, Claim 1, line 10, after "restraint" kindly delete "pd" and insert --pad--.

Signed and Sealed this

Fifth Day of October, 1993

Attest:

BRUCE LEHMAN

Attesting Officer

Commissioner of Patents and Trademarks